United States Patent [19]
McRay

[11] 3,803,379
[45] Apr. 9, 1974

[54] LASER WORKING MACHINE WITH WORKPIECE SUPPORT

[75] Inventor: Riard F. McRay, Ballston Lake, N.Y.

[73] Assignee: Systomation, Incorporated, Schenectady, N.Y.

[22] Filed: Apr. 13, 1971

[21] Appl. No.: 133,542

[52] U.S. Cl.............. 219/121 L, 269/60, 269/100
[51] Int. Cl............................................. B23k 29/00
[58] Field of Search................ 219/121 L, 121 EB; 350/321; 248/22; 269/60, 100, 285

[56] References Cited
UNITED STATES PATENTS

| | | | |
|---|---|---|---|
| 3,265,855 | 8/1966 | Norton | 219/121 LM |
| 1,746,004 | 2/1930 | Marshall | 248/22 X |
| 3,420,719 | 1/1969 | Potts | 219/121 LM |
| 3,069,935 | 12/1962 | Garvin | 269/60 |
| 2,203,162 | 6/1940 | Lee | 269/60 |
| 3,222,052 | 12/1965 | Freda | 269/100 |
| 3,519,359 | 7/1970 | Berg | 219/121 L |
| 3,422,246 | 1/1969 | Wetzel | 219/121 L |
| 2,591,461 | 4/1952 | Muller | 248/22 |
| 3,253,499 | 5/1966 | Ingalls | 350/321 |

OTHER PUBLICATIONS

"Laser Scribing Apparatus," Western Electric Technical Digest, No. 20, 10/70, p. 19.
"Laser Beam Energy Density Calibrating System," IBM Technical Disclosure Bulletin, Vol. 13, No. 6, 11/70, p. 1,588.
"Laser Beam Absorber," IBM Technical Disclosure Bulletin, Vol. 12, No. 12, 5/70, p. 2,131.
Ealing Optical Supplies Catalog, 1968, pp. 40–49.
Laser Focus, April, 1968, p. 53.

*Primary Examiner*—J. V. Truhe
*Assistant Examiner*—George A. Montanye

[57] ABSTRACT

Laser material working operations are accurately accomplished by an extremely rigid construction of the optical supporting bed and the material handling frame in combination with accurately machined locator pins and holes for preventing relative movement between the bed and frame due to shocks, vibrations and the like generally perpendicular to the laser beam, and resilient vibration isolating pads supporting the weight of the thus unitized bed and frame structure. The elongated bed if a rigid box beam and the stationary portion of the material holding frame is a one pieced steel casting. The locator holes are drilled and reamed in the frame for a force fit with the locator pins, are drilled and reamed in the bed for a tight slipfit with the locator pins, and extend axially parallel with the laser beam. Threaded fasteners extending through over size holes secure the bed and frame together and separately to the floor through the intermediary of the resilient pads. The bed is provided with a single piece slide rail for carrying thereon the laser producing means, a focusing lens, a diverter for selectively diverting the entire laser beam to be dissipated in a heat sink between operations for allowing continuous laser production, and a partially silvered mirror for reflecting a minor portion of the beam to an instrument to produce a reading of the laser beam intensity. The material is held adjustably on a vertical carrier provided by means of two columns adding to the rigidity of the vertical carrier and the stationary frame.

11 Claims, 2 Drawing Figures

LASER WORKING MACHINE WITH WORKPIECE SUPPORT

BACKGROUND OF THE INVENTION

Various laser material operating machines are well known to produce various material working processes such as welding, drilling, and machining in general. However, unlike their counterparts that use movable material engaging tools, the laser producing means is removed from the work piece at an extremely great distance. In these machines the work holding portion that will adjust the work piece in generally mutually perpendicular planes produces substantially the same errors in both the laser machines and material engaging machine tools, but only the laser machines have the added error introduced by the relatively great distance travelled by the laser beam in reaching the work piece. These machines have been constructed with completely separately mounted material holding frames and laser producing frames, so that floor vibrations and shocks will cause relative movement therebetween. The criticality of such movement may be seen by visualizing two straight lines eminating from a single point at a very sharp angle with respect to each other, which could represent on an exaggerated scale the upper and lower extreme positions of a laser beam unintentionaly being oscillated by environmental shocks and vibrations. Whatever angle is chosen for the visualization, the two lines will be at a certain distance apart 1 foot from the point and a substantially greater distance apart for example at twenty feet from the point. Laser beams can be focused to produce extremely small effective cross sectional beams at distances quite for from the laser beam for extremely accurate work, however relative vibrations between the laser producing means and work with the amplification as mentioned above is quite serious in proportion to the desired small cross section of the beam at the work piece. With accuracies measured in thousandths of an inch or less, it is seen from the above that a considerable problem exists, which is peculiar to the laser working machines.

The study of vibrations has shown that the source of vibrations may have a sympathetic effect only at a quite remote and localized position that is extremely hard to predict and when considering all of the sources of vibrations such as machines, passing trucks or the like, and similar sources of various shocks, it is impossible to predict where their effects will be most intense and to what extent they will be localized. Due to the relatively great distance between the laser producing means and the work piece of conventional laser material working machines the vibrations and shocks will be unequally applied to the two parts when they are separately mounted or even when what would normally be considered as integrally constructed. The range of shocks and vibrations that would be considered as being critical and of concern is greatly increased with a corresponding increase of desired accuracy due to the aforementioned magnifying effect of the distance between the beam producing means and work piece.

It is for these reasons that accuracy in laser material working operations has been a considerable problem despite the fact that laser beams are well suited for precision operation because they may be accurately focused to very fine points where they strike the work piece. Such accurate focusing is advantageously done over a relatively long path of travel, which has a self-defeating result of increasing the above-mentioned inaccuracies due to vibrations, shocks and the like.

The above-mentioned existing laser material working machines further have the disadvantage of requiring shut down of the laser producing means during periods when a laser beam is not desired in the vicinity of the work piece, for example when changing work pieces or adjusting the work piece so that the work piece will not be damaged and personnel will not be injured. Such shuting down and starting up of the laser will correspondingly cycle its temperature to produce a corresponding cycling in the intensity of the laser beam produced. Such a change in the intensity from one operation to another is undesirable in that it will produce corresponding changes in the effect upon the work piece, which must be tolerated as inaccuracies or compensated by extremely sensitive and complex controls feeding back information and perhaps adjusting the laser pumping.

SUMMARY OF THE INVENTION

The present invention has as an object to overcome the above-mentioned disadvantages of prior art laser working machines, by a particularly rigid construction of the optical system mounting bed, a particularly rigid construction of the material holding frame, accurately milled locator means directly between the frame and bed, and vibration isolating mountings between the floor and thus unitized frame and bed so that the entire machine acts as a single isolated beam.

The bed is generally constructed of a hollow box beam with end plates and an optical system mounting slide over its entire upper surface. The optical system components are mounted on the slide with the laser producing means at one end, and a lens system, diverter system and power measuring system between the laser and work piece holding frame that is at the other end of the bed. The stationary portion of the work holding frame is constructed in one piece from cast steel. The frame and bed are interconnected by bolts passing through oversized holes in one member and being threaded in the other member, with relative motion therebetween being prevented by means of accurately machined cylindrical locator pins extending generally parallel to the path of beam travel, which pins are received with a force fit in drilled and reamed holes of one member and received with a tight slip fit in drilled and reamed holes of the other member. Thus, a unitary optical and work piece holding effective beam is produced.

The effect of vibrations and shocks upon the system is further minimized by mounting the unitized bed and frame on vibration isolating resilient pads to support the entire weight of the machine relative to a rigid floor.

The rigidity of the vertical adjustment for the work piece is greatly enhanced by a box type frame for the vertical carrier that is mounted on stationary bracing columns on its opposite sides by means of column encircling bearings at substantially the four corners.

A measure of the beam intensity is obtained by a partially silvered mirror reflecting a portion of the beam to a suitable instrument. Inaccuracies in the beam intensity are minimized to a great extent by diverting the entire beam to be absorbed in a suitable heat sink during periods when it is not desired in the vicinity of the work piece so that the laser producing means may continue to fire at its normal rate which will maintain the equilibrium condition of its temperature, which will avoid changes in intensity due to heating and cooling of the laser producing means that would otherwise be produced by start up and shut down.

BRIEF DESCRIPTION OF THE DRAWING

Further objects, features and advantages of the present invention will become more clear from the following detailed description of the drawing, wherein.

DETAILED DESCRIPTION OF THE DRAWING

Figure 1:
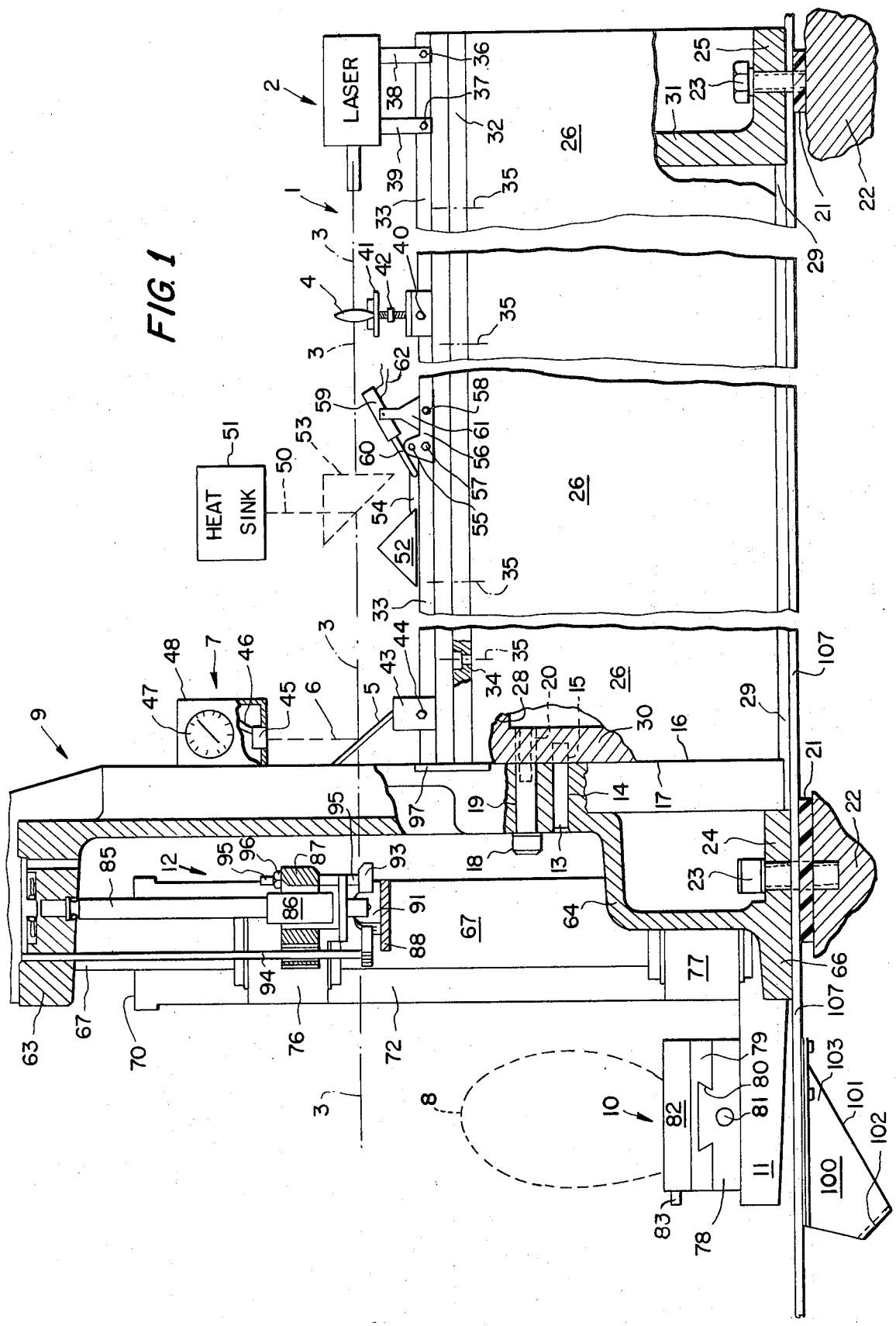
FIG. 1 is a side elevation view, partially in section and with portions broken away, of a laser material working machine according to the present invention.

In the machine of the present invention, a laser apparatus carrying bed 1 carries thereon a conventional type of laser beam producing means 2, which may be of the ruby crystal type or gas type, for example. The laser means 2 produces a pulsed laser beam that will travel along a linear path 3 first through a concentrating converging lens system 4 to a partially silvered mirror 5 where a major portion of the beam passes therethrough, for example 99 percent of the beam's power and a minor portion of the beam's power is reflected 90° along the control path 6. The portion of the beam passing along the control path 6 will be intercepted by the instrument 7 and converted into a visual indication of the strength of the laser beam that passes through the partially silvered mirror 5.

A work piece 8 of any kind is adjustably mounted by a rigid material frame 9 for movement in three mutually perpendicular planes for adjustment of the intersecting point between the laser beam path 3 and the work piece to perform a suitable working function, for example precision drilling, contour machining or welding. The work piece 8 is directly mounted on the work table of a conventional type cross slide mechanism 10 for adjustment in mutually perpendicular horizontal directions. The cross slide mechanism 10 is in turn carried by a table 11 for vertical movement under control of the vertical traverse mechanism 12. In conventional machining, welding, drilling and the like operations, the distances involved between effective reference points on the work piece and for the tool are quite small so that with suitably rigid construction desirable tolerances have been maintained. However, in the use of a laser beam, there is usually a great distance between the source of the laser beam and the work piece, it being noted here tha the laser apparatus carrying bed has been broken away in numerous areas to greatly reduce its illustrated length solely for the purpose of providing greater clarity of the various parts in the total mechanism for FIG. 1, whereas in the actual construction of the machine this bed would be many times longer. In practice errors have been produced in the working of the work piece by the laser beam due to temperature changes, vibrations, and the like that would tend to relatively move the work piece and laser means. The laser apparatus carrying bed of the present invention is of a massive rigid construction, as is the material frame. Of greater importance, however, is the novel connection between these two rigid and massive units.

In assembling and securing the material frame 9 with respect to the laser apparatus carrying bed, locator pins 13 are used to prevent relative vertical movement between the bed 1 and frame 9. These locator pins 13 are received with a force fit in drilled and reamed holes 14 within the frame 9 and revevied with a tight substantially no tolerance slip fit within drilled and reamed holes 15 in the bed 1. The locator pins 13 are cylindrical and accurately machined for this purpose. The abutting vertical surfaces 16 and 17 of the frame 9 and bed 1 are tightly held together to limit relative movement in the direction of path 3 by means of a plurality of threaded fasteners 18 passing through suitable oversized holes 19 in frame 9 and threadably engaged in tapped holes 20 in the bed 1. For further accuracy, these surfaces 16 and 17 may be machined if desired, but this is not absolutely necessary.

From the above, it is seen that the frame 9 and the bed 1 are fairly rigidly clamped together but the oversized holes 19 allow sufficient adjustment to accommodate the locator pins 13, which are the accurately formed items. Relative movement in the vertical direction would have a great effect due to the length of the laser beam path. However, some degree of vibratory movement in the direction of path 3 may be tolerated, since it would be in the same direction as the laser beam path and would have very little effect upon the accuracy of the work being performed.

To further assure that the frame 9 and bed 1 function as one extremely rigid beam unit relatively unaffected by environmental disturbances, resilient vibration isolating pads 21 are placed between the frame 9 and a stationary support 22, which may be a concrete building floor, and between the bed 1 and the support 22. Suitable threaded fasteners 23 are passed through oversized holes in horizontally extending flanges 24 of the frame 9 and 25 of the bed 1 to pass through the vibration isolating pads 21 and to be secured within threaded inserts or the like of the floor 22.

Thus, the entire weight of the frame 9 and bed 1 will be carried by the vibration isolating pads 21, which feature coupled with the rigid clamping of the fasteners 21 and locator pins 13 will assure that the bed 1 and frame 9 function as a single isolated beam at least with respect to relative bending and vertical movement between the extreme left end of the frame 9 and the extreme right end of the bed 1. Accordingly, this will greatly contribute to the accurate working of the laser beam that traverses this entire distance.

The above-mentioned single beam function is further made possible by the extremely rigid construction of the bed 1. The main portion of the bed 1 is a horizontally extending box beam elongated in a direction parallel to the laser beam path 3. This box beam is of a one piece construction, preferably of massive rolled beams continuously welded together to form in cross section a box having side walls 26, 27, top wall 28, and a bottom wall 29. To further assure rigidity at opposite ends of the box beam, end plates 30 and 31 are rigidly secured to the walls 26–29 of the box beam, preferably by welding. As seen, the end plate 31 is is one piece with the previously described mounting flange 25. To the top wall 28 of the beam, there is mounted a slide 32 having thereon an upwardly extending dove tail mounting rail 33 for carrying the laser items 5, 4, 2. The slide 32, with its rail 33 is of a fairly massive construction in one piece throughout its entire length and rigidly secured to the top wall 28 by means of a plurality of threaded fasteners 34 at locations 35 at equally spaced intervals along the entire length of the bed 1. While the slide 32 is, as mentioned above, fairly rigid and tightly secured to the box beam with threaded fasteners, its movement with respect to the box beam is not critical in the same sense as movement between the frame 9 and the far right-hand portion of the box beam. This is so because small vertical relative movements between the mirror 5 and laser beam path 3, and the lens 4 and laser beam path 3 would have not effect upon the point at which the laser beam 3 intersects the work piece 8, whereas any minute movement anywhere along the work piece and laser beam supporting composite integral beam of the frame 9 and bed 1 would be magnified greatly over the great distance traversed by the beam moving along the path 3.

The laser producing means 2 is bolted to the dove tail mounting rail 33 by means of threaded clamp fasteners 36, 37 and depending mounting arms or the like 38, 39, the structure of which may be conventional and the details of which are of no great consequence to the present invention although they must be rigid. In a like manner, the lens 4 is somewhat schematically shown as being mounted to the dove tail mounting rail 33 by threaded fastener 40 used to clamp the frame 41. The position of the lens 4 may be adjusted in the vertical direction by means of a right and left hand threaded shaft 42, for example, and may also have means for tilting it about an axis perpendicular to the plane of FIG. 1 for initially adjusting the path 3 of the laser beam. The exact construction of the mounting for the lens 4 has not been shown in great detail, since its details are not important to the present invention. Further, it is seen that the mounting rail 33 will allow adjustment of the lens 4 along the laser beam path 3 to provide the desired focusing of the laser beam upon initial setup.

As briefly mentioned above, the instrument 7 will provide a visual reading of the effective laser beam intensity. The partially silvered mirror 5 is held at substantially at 45° angle with respect to the laser beam path 3 by a suitable mounting 43 having a threaded fastener 44 for clamping it to the dove tail mounting rail 33 at a desired position along its length. Again, the details of the mounting 43 are of little consequence to the present invention, except that it is fairly rigid and may be moved along the mounting rail 33 to align the reflected control path 6 with a transducer 45 for converting the reflected portion of the laser beam into preferably an electrical signal in wires 46; for example, the transducer 45 may be a photoelectric cell. The wires 46 will conduct the thus created electrical signal to a suitable electronic circuit for powering the indicator 47, which may be of a conventional dial type construction with a movable pointer. The instrument housing 48 is suitably secured to an adjacent surface of the frame 9. As mentioned previously, a small fixed portion, for example 1 percent, of the intensity of the laser beam travelling along the path 3 is reflected upwardly along the control path 6. This reflected portion will strike the transducer 45 to produce an electrical signal in the wires 46 that will be correlated in power to the power of the reflected portion of the beam travelling along the path 6 and in turn correlated to the power of the beam that has passed through the partially silvered mirror 5 along the path 3. Thus, the visual indication afforded by the indicator 47 may be appropriately calibrated to accurately indicate the strength of the laser beam that passes through the partially silvered mirror 5 to strike the work piece. Although only a small portion of the laser beam intensity is reflected along the control path 6, its intensity is still so great with respect to any fluctuations in background light, that this reading would be quite accurate.

Another important feature of the present invention is that accuracy in machining will be further enhanced due to the uniformity of the beam that reaches the work piece at least partially as the result of the diverter mechanism 49, that will when desired divert the entire laser beam from the path 3 to a suitable transversely extending diverted path 50 that leads to a heat sink 51 of such a construction that it will absorb the entire power of the laser beam over an indefinite period of time without harm to the surroundings or any personnel working in the area. The heat sink 51 may be, for example a large tank of water, which may have auxiliary cooling means such as a refrigeration unit. Thus, when it is desired to move the work piece, change the work piece, or when a specific operation has been completed and the beam is no longer needed or desired, the diverter mechanism 49 will divert the entire beam from the path 3 to the path 50 so that it will have no further affect upon the work piece 8 and cannot in any way harm personnel working in the area. This division is most desirable in that it allows the laser producing means to keep firing at a uniform rate without being shut down so that its temperature, once established under equilibrium conditions, will not be altered between working operations. This is quite important in that the temperature of the laser producing means determines to a great extent the intensity of the laser beam produced so that in other machines the laser beam intensity has changed considerably from one working operation to another due to shut down between operations. This is true whether the laser producing means is cooled or has other temperature controlling means associated therewith.

The diverter mechanism 49 according to the specific embodiment of the present invention includes an optical prism 52 but may be pivoted from its full line illustrated position completely out of the laser beam path 3 where it will have no effect to its dotted line position illustrated at 53 where it will be optically in the laser beam path 3 to divert the entire laser beam along the diverted path 50. For this purpose, the prism 52 is carried by a mounting arm 54 that is pivotally mounted on a horizontally extending pin 55. In turn the pin 55 is journalled within opposed ears of a mounting base 56 that is secured by means of fasteners 57, 58 to the mounting rail 33. The clamping of the mounting base 56 on the mounting rail 33 by means of the fasteners 57, 58 will afford an initial setup adjustment along the length of the mounting rail 33 parallel to the laser beam path 3 so as to accurately align the diverted path 50 with the stationary heat sink 51. Pivotal movement of the arm 54 is selectively accomplished by means of a cylinder 59 having conventionally mounted therein a piston (not shown) connected to a piston rod 60 that is pivotally connected at its opposite end to the arm 54. To accommodate pivotal movement of the cylinder 59, there is a pivotal connection between the mounting ears 61 of the mounting base 56 and the cylinder 59. In a conventional manner, pressurized fluid is selectively provided to the line or lines 62 for moving the prims 52 between its two positions. Also, the piston-cylinder unit may be replaced by a solenoid.

To further contribute to the stability of the positioning of the work piece 8 with respect to the laser producing means 2, the material frame 9 includes a preferably cast massive steel one piece outer box frame having an upper cross beam 63, side solumn portions 64, 65 and lower cross base beam 66. The rigidity of this box frame is further increased by two cylindrical, preferably tubular, vertical columns 67, 68 that are rigidly secured at their upper terminal end to the upper beam 63 and at their lower terminal end to lower cross base beam 66.

Within this main stationary frame there is mounted a vertically movable carrier box frame 69, which is preferably cast in one piece from steel and comprises an upper cross beam 70, side portions 71, 72, a lower cross beam 73, and bearing mounting extensions 74 and 75 carried outwardly by the side portion 71 and 76, 77 carried outwardly by the side portion 72 respectively at upper and lower ends. These bearing mounting extensions have suitable bearings therein for encircling respectively the vertical columns 57 and 68 to provide for vertical movement of the carrier 69 and prevent all other movement.

As shown most clearly in FIG. 1, the vertical carrier 69 has a cantilevered table 11 cast in one piece therewith to rigidly support the conventional work table cross slide 10. The cross slide mechanism 10 includes a base 78 bolted or otherwise rigidly secured to the table 11, an intermediate slide 79 connected to the base 78 by a dove tail conventional way 80 for horizontal movement perpendicular to the plane of FIG. 1. For this purpose, a suitable threaded shaft 81 is provided in a conventional manner for adjustment between the base 78 and slide 79. In a similar manner, there is a dove tail way connection between the intermediate slide 79 and the top slide 82 for relative movement in a direction that would be horizontal and perpendicular to the plane of FIG. 2; this relative movement is accomplished by means of the threaded shaft 83 in a well known manner. The work piece 8 would be mounted in a conventional manner on the top of the slide 82 so that it could be adjusted in two mutually perpendicular horizontal directions with respect to the table 11. At this point, it is mentioned that some of the details shown in FIG. 1 have been omitted from FIG. 2 where their inclusion therein would not materially contribute to the disclosure and would tend to take emphasis away from some of the other disclosed features.

The vertical carrier 69 is selectively driven in the vertical direction along the columns 67, 68 by means of an electric motor 84 which is suitably mounted on the upper cross beam 63 and has its axis of rotation extending in the vertical direction. The output shaft of the motor 84 is drivingly connected to a rotatable but axially fixed threaded shaft 85. The threaded shaft 85 is threadably received within a nut 86 non-rotatably held within a drive extension 87 that is preferably cast integrally in one piece with the bearing mounting extension 76. Thus, with rotation of the shaft 85 in one direction, the nut 86 will through the extensions 87, 86 drive the carrier 69 upwardly and rotation of the shaft 85 in the opposite direction will drive the carrier 69 downwardly. For this purpose, the electrical motor 84 is reversible or alternatively provided with suitable reversing gears and clutches to accomplish the selective reversal of the rotation of the shaft 85.

The controls for the present invention may take on many forms and in general will not be described or shown. However, the mechanical linkage for the controls of the vertical carrier are of particular interest and will be described in detail. The side column portion 64 of the stationary frame has mounted thereon an L-shaped bracket 88 by means of fasteners 89, 90. A U-shaped bearing block 91 is mounted by fasteners 92 to the horizontal portion of the L-shaped bracket for pivotally receiving between its legs an actuating lever 93. Suitable controls within the motor housing for responding to an indication of the lower most position of the vertical carrier 69 are actuated by upward reciprocation of the connecting rod 94, which is reciprocally mounted at its upper end within the upper beam 63 and pivotally mounted at its lower end to one end of the lever 93, while freely passing through an oversized vertical bore within the drive extension 87. The lever 93 is pivoted to raise the connecting rod 94 when the vertical carrier 69 is in its lower most position by means of a threaded rod adjustably and threadably received within the drive extension 87 and locked in its adjusted position by means of a lock nut 96. Thus, when the vertical carrier is moved to its lower most position, the threaded shaft 95 will move one end of the lever 93 downward to pivot the opposite end of the lever 93 upward, which in turn will move the control rod 94 upward for actuating a motor de-energizing switch via dog 108, the same type of zero position control is used for each of the shafts 81 and 83.

During various working operations, metal chips, molten splashes, or other waste material is prevented from generally reaching the slide 32 by a cover plate 97 that is secured by means of fasteners 98, 99 to the end plate 30 of the bed 1. Also, much of this waste material is caught and held in a waste disposal trough 100 having the bottom rear wall 101, a front botton wall 102, and side walls 103, 104. The side walls carry suitable flanges that are bolted at 105, 106 respectively to a bottom plate 107. This trough is also useful for holding waste material that is swept from the surrounding areas.

OPERATION

Figure 2:
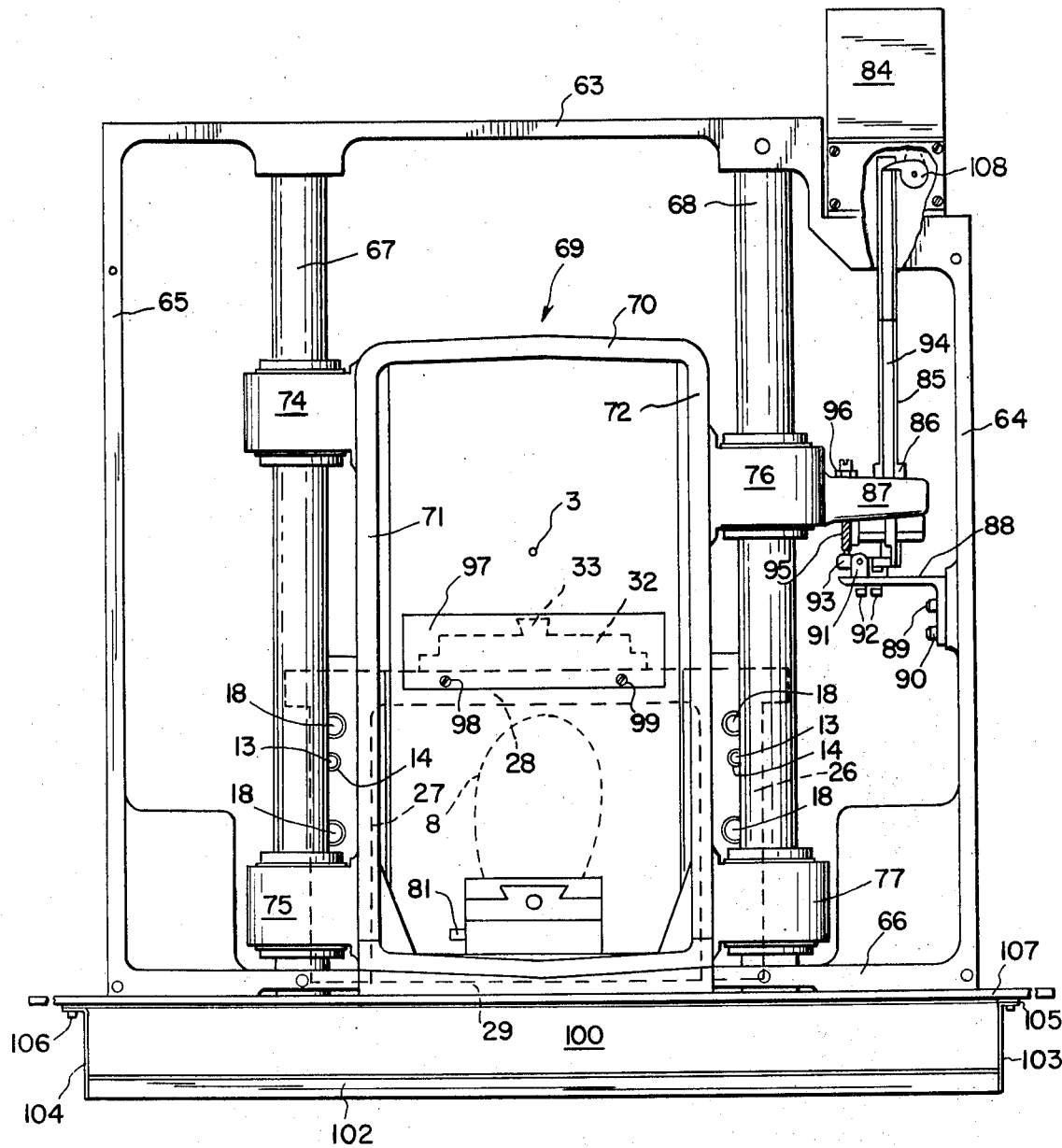
FIG. 2 is a front elevation view of the machine according to FIG. 1.

A work piece that is to be drilled, welded or the like by a laser beam is secured to the work table of top slide 82 so that it is horizontally adjusted within the plane of FIG. 1 by means of shaft 83 moving top slide 82, horizontally adjusted within the plane of FIG. 2 by means of shaft 81 moving intermediate slide 79, and vertically adjusted by means of the reversible motor 84 driving the threaded shaft 85 within the nut 86 that is mounted to move with the extension 76, 87 of the vertical carrier 69, which vertical carrier 69 has mounted thereon by the table 11 the cross slide mechanism 10. The work piece may be adjusted between and during various working operations. The laser is usually set up only once for each type of working process. The laser producing means 2 is mounted at the far right hand end of the bed 1 so as to produce a pulsed laser beam in a conventional manner along the path 3 to pass through the focusing lens 4, which may be vertically adjusted and moved horizontally in the plane of FIG. 1 along the slide rail 32. A measure of the intensity of the laser beam reaching the work piece 8 will be determined by a small portion of its intensity, for example 1 percent, being reflected by partially silvered mirror 5 to a transducer 45, which is preferably a photocell or photodiode, to operate a visual indicator 47 showing the intensity of that portion of the beam that passes through mirror 5.

Between actual working operations, it is not necessary to shut down the laser producing means, which would have the disadvantage of altering its temperature and thus its output, because at this time the optical prism 52 is moved from its illustrated full line position to its dotted line position 53 by means of the operator 59 so that the entire laser beam is reflected along path 50 to be dissipated in a suitable heat sink 51.

Any relative movement between the laser producing means 2 and the workpiece 8, transverse to the beam path 3, is extremely critical in view of the fact that this movement is greatly magnified by the considerable distance between these two elements. Portions of the bed 1 have been broken away to reduce its length only for purposes of illustration.

The vertical and horizontal adjustments provided by the cross slide 10 and vertical carrier 69 will produce some errors, which of course may be minimized in a conventional manner. With this in mind, the present invention greatly reduces any critical relative movement between a laser producing means 2 and the stationary work holding frame 9 by providing an extremely rigid cast and braced stationary frame 9, an extremely rigid box beam bed 1, locator pin 13 with drilled and reamed holes between the above-mentioned two items so that they will act as if they are a one piece composite beam with respect to relative movements in the plane of FIG. 2, and vibration and shock isolating pads supporting the above-mentioned composite beam. In setting up the apparatus, the above is accomplished by drilling and reaming holes 14 and holes 15 respectively in the rame 9 and bed 1 of different accurate sizes so as to receive the cylindrical accurately machined locator pin 13 with the press fit in frame 9 and a sliding fit within bed 1 to prevent all movement therebetween in the plane of FIG. 2, that is, transverse to the laser beam path 3. This effectively one piece connection is further enhanced by the fasteners 18 passing through oversized holes in the frame 9 and being threaded into the bed 1. Resilient pads 21 are then placed beneath the frame 9 and bed 1 and the supporting floor 22 so as to isolate the composite beam 9, from environmental vibrations, shocks and the like.

While a specific embodiment of the present invention has been set forth for purposes of illustration, it is recognized that the details thereof are extremely important in a narrow sense of the invention and that further modifications, embodiments and variations thereof are contemplated within the broader spirit and scope of the invention as defined by the following claims.

What is claimed is:

1. A laser material working machine, comprising: a rigid bed having a rigid mounting surface; means on said mounting surface for mounting means to produce a laser beam along a predetermined path adjacent said mounting surface; rigid frame means for holding material to be worked upon by the laser beam; means for rigidly directly connecting said rigid frame means to said rigid bed to prevent relative vibrations and movements therebetween generally in a plane perpendicular to the predetermined laser beam path; said directly connecting means including at least one locator hole in each of said rigid bed and rigid frame means being aligned, said locator holes being accurately machined with a smooth bore, and said locator holes being generally parallel with the laser beam predetermined path; and said directly connecting means further including at least one locator pin tightly engaging the aligned locator holes to prevent any relative movement or vibration between said rigid frame means and rigid bed perpendicular to the laser beam predetermined path.

2. The machine of claim 1, wherein one locator hole is of a first predetermined diameter and the other locator hole is of a second different predetermined diameter, and said locator pin is of a uniform diameter larger than said first locator hole to provide an accurate press fit therebetween and of substantially the same diameter as said second locator hole to provide an accurate slip fit therebetween.

3. The machine of claim 1, including vibration isolating resilient pad means for supporting the entire weight of said rigid frame means and rigid bed relative to a stationary support surface.

4. The machine of claim 1, including at least one additional identical locator pin and at least one additional pair of aligned locator holes respectively identical to and transversely spaced a substantial distance from the corresponding first-mentioned locator holes.

5. The machine of claim 4 wherein said directly connecting means further includes claimping means clamping said rigid bed and rigid frame means together in a direction generally parallel to the laser beam predetermined path, said clamping means further having lost motion perpendicular thereto to permit relative movement in a plane perpendicular to the laser beam predetermined path.

6. The machine of claim 5, wherein said clamping means include a plurality of threaded fasteners extending through oversized holes in one of said rigid bed and rigid frame means, and being threadably engaged within the other of said rigid bed and rigid frame means.

7. The machine of claim 5, wherein said locator holes of each aligned pair are of different first and second predetermined diameters, and said locator pins are all of one predetermined diameter larger than said locator hole first predetermined diameter to provide an accurate press fit therebetween and of substantially the same diameter as said locator hole second predetermined diameter to provide an accurate slip fit therebetween.

8. The laser machine of claim 1, wherein said rigid bed includes a one piece metallic box beam having opposed parallel elongated sides, opposed parallel elongated top and bottom plates extending in length parallel to said side plates and parallel to the laser beam predetermined path, and rectangular end metallic plates rigidly interconnecting said side, top and bottom plates; and said bed further including a way rigidly mounted on said top plate to extend the full length of said box beam and having at least one dove tail connecting means extending upwardly along its entire length.

9. The machine of claim 1, wherein said rigid frame means is a one piece massive casting.

10. A laser material working machine, comprising: a rigid bed having a rigid mounting surface; means on said mounting surface for mounting means to produce a laser beam along a predetermined path adjacent said mounting surface; rigid frame means for holding material to be worked upon by the laser beam; means for rigidly directly connecting said rigid frame means to said rigid bed to prevent relative vibrations and movements therebetween generally in a plane perpendicular to the predetermined laser beam path; said rigid frame means being of an integral rigid stationary construction having opposed side portions and opposed top and bottom portions interconnected to form a central open area surrounding the laser beam predetermined path and said portions lying generally in a palne perpendicular to said laser beam predetermined path, and further including two parallel column ways extending in said central open area on each side of the laser beam predetermined path and each column way being fixedly connected to opposed portions; movable material holding means including an integral rigid frame having opposed side portions and opposed top and bottom portions rigidly connected together to be open in the center for passage therethrough of the laser beam, and said movable material holding means lying within said stationary rigid frame means central open area; a pair of bearing members slideably engaging each of said column ways and being rigidly connected to opposed portions of said movable material holding means; and means adjustably interconnecting said stationary frame means and said movable material holding means for powered relative movement therebetween in a direction parallel to said column ways.

11. The laser machine of claim 10, wherein said movable material holding means includes a cantilevered support base rigidly extending from said movable material holding means botton portion; and further including a cross-slide table having means on its top for directly mounting a material to be operated upon by said laser beam and adjustably mounting said table with respect to said cantilevered support base in two mutually perpendicular directions, each of which being perpendicular to the extent of said column ways.

* * * * *